United States Patent
Zollers et al.

(10) Patent No.: US 9,146,016 B2
(45) Date of Patent: Sep. 29, 2015

(54) TILING OF MULTIPLE POLYGONS FOR MICRO-LENS ARRAY

(71) Applicant: FRAEN CORPORATION, Reading, MA (US)

(72) Inventors: Michael Zollers, Burlington, MA (US); James Preston, Malden, MA (US); Brien J. Housand, Worcester, MA (US)

(73) Assignee: Fraen Corporation, Reading, MA (US)

( * ) Notice: Subject to any disclaimer, the term of this patent is extended or adjusted under 35 U.S.C. 154(b) by 103 days.

(21) Appl. No.: 13/853,480

(22) Filed: Mar. 29, 2013

(65) Prior Publication Data

US 2013/0286662 A1     Oct. 31, 2013

Related U.S. Application Data

(60) Provisional application No. 61/617,143, filed on Mar. 29, 2012.

(51) Int. Cl.
| | |
|---|---|
| *F21S 8/00* | (2006.01) |
| *F21V 5/00* | (2015.01) |
| *F21V 5/04* | (2006.01) |
| *G02B 19/00* | (2006.01) |

(52) U.S. Cl.
CPC .............. *F21V 5/004* (2013.01); *F21V 5/045* (2013.01); *G02B 19/0028* (2013.01); *G02B 19/0047* (2013.01)

(58) Field of Classification Search
CPC ..... F21V 5/004; F21V 5/045; G02B 19/0047; G02B 19/0028
USPC .............................. 362/336, 333, 326, 311.01
See application file for complete search history.

(56) References Cited

U.S. PATENT DOCUMENTS

| 7,758,208 B2 | 7/2010 | Bailey |
|---|---|---|
| 2009/0168414 A1 | 7/2009 | Bailey |

(Continued)

FOREIGN PATENT DOCUMENTS

| WO | 9722032 A1 | 6/1997 |
|---|---|---|
| WO | 0210804 A1 | 2/2002 |

(Continued)

OTHER PUBLICATIONS

International Search Report issued Sep. 18, 2013 for International Application No. PCT/US2013/034601, (6 pages).
International Search Report issued Sep. 18, 2013 for International Application No. PCT/US2013/034601, (7 pages).
Partial International Search Report dated Jul. 11, 2013 for PCT/US2013/034601.

(Continued)

*Primary Examiner* — Joseph L Williams
(74) *Attorney, Agent, or Firm* — Reza Mollaaghababa; Thomas J. Engellenner; Pepper Hamilton LLP (57) ABSTRACT

Optics and optical devices and systems are disclosed that employ a plurality of refractive and/or reflective optical elements, such as lenses and mirrors, with different shapes to achieve a desired illumination pattern. In various aspects, a plurality of lenses in which at least two of the lenses have different boundary shapes are arranged, e.g., according to a predefined pattern, to receive light from one or more light sources and to redirect the received light to form collectively a desired far-field illumination pattern. For example, the lenses can be configured such that the far-field illumination pattern has a boundary shape that is different from the boundary shape of a far-field illumination pattern that can be provided individually by the lenses.

23 Claims, 9 Drawing Sheets

(56) References Cited

U.S. PATENT DOCUMENTS

2010/0208487 A1    8/2010   Li
2011/0188242 A1*   8/2011   Brick et al. .................. 362/235

FOREIGN PATENT DOCUMENTS

| WO | 2004027495 A2 | 4/2004 |
| WO | 2007121486 | 10/2007 |

OTHER PUBLICATIONS

Muschaweck, Randomized Micro Lens Arrays for Color Mixing, Light-Emitting Diodes: Materials, Devices, and Applications for Solid State Lighting XV, (Feb. 10, 2011) 7954(1):1-10.

PCT International Preliminary Report of Patentability and PCT Written Opinion of the International Searching Authority for PCT/US2013/034601 mailed Oct. 9, 2014 (9 sheets).

* cited by examiner

TILING OF MULTIPLE POLYGONS FOR MICRO-LENS ARRAY

CROSS REFERENCE TO RELATED APPLICATIONS

This application claims priority to U.S. Provisional Application Ser. No. 61/617,143, filed on Mar. 29, 2012, the contents of which are incorporated by reference in their entirety.

BACKGROUND

The present invention is generally directed to optics, optical devices and systems in which a plurality of optical elements, e.g., lenses and/or mirrors, having different shapes are employed to obtain, for example, a desired far-field illumination pattern.

Microlens arrays are employed for diffusing light exiting an optic. In many such optics, a far-field illumination pattern generated by the microlens arrays can exhibit intensity variations due to the shapes of the microlenses. Further, the boundary shape of the far-field illumination pattern can carry the shapes of the microlenses. In some applications, such influence of the microlens arrays on the intensity distribution and overall shape of the far-field illumination pattern can be undesirable.

SUMMARY

In some aspects, the present teachings are directed to optics, optical devices, systems and methods that allow generating a desired far-field illumination pattern by employing a plurality of differently shaped optical elements, e.g., lenses. In some embodiments, a plurality of lenses can be arranged as a tiling of multiple polygons in various configurations and densities to create a desired far-field illumination pattern. Many variations of the multiple polygon tilings can be employed, e.g., based on a particular application and considerations regarding manufacturing, cost, etc. For example, in some cases, simple tiling patterns can provide ease of manufacturing, while more complex patterns can provide a more homogeneous and/or round beam appearance. In many embodiments, the number, type and tiling pattern of polygons representing the boundary shapes of a plurality of lenses can be varied to create a desired beam appearance, e.g., a desired far-field illumination pattern. For example, in some embodiments, a far-field illumination pattern generated collectively by a plurality of lenses having different polygonal boundary shapes can have a shape corresponding to a partial overlap of the shapes of those lenses. In many embodiments, such overlap of different shapes can allow generating a desired boundary shape, e.g., a substantially circular shape, for the far-field illumination pattern. In some embodiments, increasing the number of different polygons and different ways those polygons are oriented in a tiling pattern associated with the lenses can be utilize to minimize the differences between a desired far-field illumination pattern and a respective pattern obtained by employing the lenses. In some embodiments, one or more optical parameters of the individual lenses, e.g., focal length, can be varied to obtain a desired illumination pattern. For example, lenses having different shapes and focal lengths can be employed. For example, in some embodiments, among the lenses having the same boundary shape, some can have a different focal length than others.

In one aspect, an optical system is disclosed, which comprises a plurality of lenses positioned relative to one another according to a predefined pattern and adapted to receive light from a light source, wherein at least two of said lenses have different boundary shapes.

In some embodiments, the lenses are arranged such that a far-field illumination pattern generated by said at least two lenses having different boundary shapes overlap.

In some embodiments, the lenses are arranged such that a far-field illumination pattern collectively generated by said lenses exhibits a boundary shape different than a respective boundary shape of a far-field illumination pattern generated individually by any of said lenses.

In some embodiments, the lenses are arranged such that a far-field illumination pattern collectively generated by said lenses exhibits a super Gaussian intensity distribution along two orthogonal directions in a plane perpendicular to a central axis of light propagation.

In some embodiments, the lenses are arranged such that a projection of said lenses on at least one surface results in a tiling pattern in said surface. In some cases, such a tiling pattern can be a polygonal tiling pattern.

In some embodiments, the lenses are arranged such that each of said lenses contacts its neighboring lens(es).

In some embodiments, at least one of said lenses has a polygonal boundary shape. By way of example, the polygonal boundary shape can be any of a hexagonal, octagonal, rectangular, square and triangular shape.

In further aspects, an optic is disclosed, which comprises an input surface adapted to receive light from a light source, and an output surface through which light exits the optic, wherein said output surface comprises a plurality of lenses such that a boundary shape of at least one of said lenses is different from a boundary shape of at least another one of said lenses.

In some embodiments, the lenses are arranged such that a far-field illumination pattern generated by at least two lenses having different boundary shapes overlap. In some cases, the lenses can be arranged such that a far-field illumination pattern generated collectively by said lenses exhibits a boundary shape different than a respective boundary shape of a putative far-field illumination pattern that could be generated individually by any of said lenses.

In some embodiments, the far-field illumination pattern exhibits a super Gaussian intensity distribution along two orthogonal directions in a plane perpendicular to a central axis of light propagation.

In some embodiments, the lenses comprise a plurality of microlenses. In some embodiments, at least one of said lenses comprises a polygonal boundary shape, such as a hexagonal, octagonal, a rectangular, a square or a triangular shape.

In some embodiments, the optic comprises an optical axis and wherein a projection of said lenses onto a surface orthogonal to said optical axis provides a tiling distribution of boundary shapes of said lenses on said surface. In some embodiments, such a tiling distribution can be a polygonal tiling.

In further aspects, an optic is disclosed, which comprises a lens body having an input surface adapted to receive light from a light source and an output surface, at least one of said input and output surfaces comprising a plurality of lenses, wherein at least one of said lenses has a boundary shape that is different than a respective boundary shape of at least another one of said lenses.

In some embodiments, the lenses exhibit polygonal boundary shapes. In some embodiments, lenses are arranged relative to one another so as to provide a tiling pattern. In some embodiments, such a tiling pattern is based on a predefined grid.

In some embodiments, the lenses are configured such that a far-field illumination pattern generated collectively by said lenses exhibits a boundary shape that is different than a respective boundary shape of a far-field illumination pattern generated individually by any of said lenses In some embodiments, a surface comprising said lenses exhibits a base curvature.

In further aspects, an optical system is disclosed, which comprises a plurality of optical elements, e.g., lenses and/or mirrors, adapted to receive light from one or more light sources, wherein said optical elements are configured to have a plurality of different boundary shapes and are arranged relative to one another such that a far-field illumination pattern generated collectively by said optical elements exhibits a boundary shape that is different than a respective boundary shape of a far-field illumination pattern generated individually of any of said optical elements.

Further understanding of various aspects of the invention can be obtained by reference to the following detailed description in conjunction with associated drawings.

BRIEF DESCRIPTION OF THE DRAWINGS

The person skilled in the art will understand that the drawings, described below, are for illustration purposes only. The drawings are exemplary and are not intended to limit the scope of the teachings in any way.

DETAILED DESCRIPTION

The present invention generally relates to optics and optical devices and systems that employ a plurality of refractive and/or reflective optical elements, such as lenses and mirrors, with different shapes to achieve a desired illumination pattern. For example, in some cases, a plurality of lenses in which at least two of the lenses have different boundary shapes are arranged, e.g., according to a predefined pattern, to receive light from one or more light sources and to redirect the received light to form collectively a desired far-field illumination pattern. For example, the lenses can be configured such that the far-field illumination pattern has a boundary shape that is different from the boundary shape of a far-field illumination pattern that can be provided individually by the lenses. While in some embodiments, the present teachings can be implemented as an arrangement of stand-alone lenses, in other embodiments the lenses can form at least a surface of an optic or can be disposed on a surface of an optic.

Figure 1A:
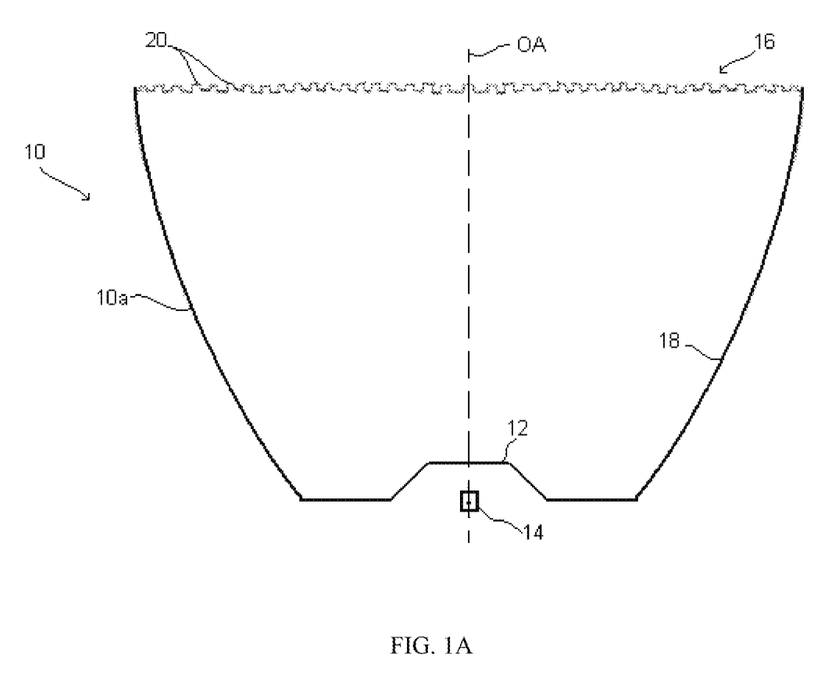
FIG. 1A is a cross-sectional view of an exemplary optic according to an embodiment of the invention having a plurality of microlenses.
Figure 1B:
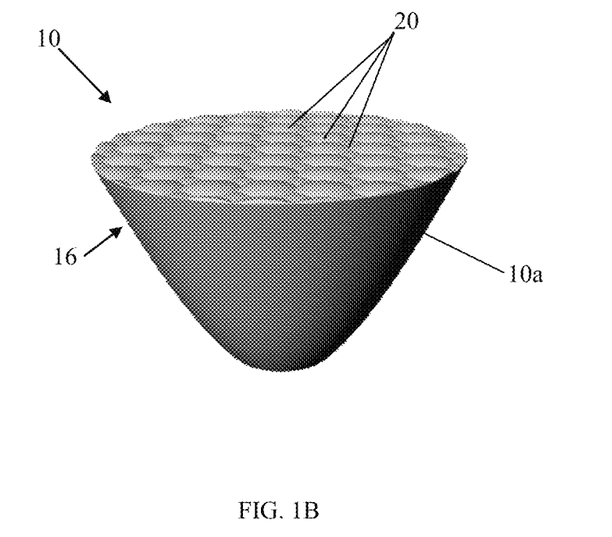
FIG. 1B is a partial side view of an exemplary optic according to an embodiment of the invention having a plurality of microlenses arranged in a truncated square tiling pattern.

By way of example, FIGS. 1A and 1B schematically depict an optic 10 according to an embodiment of the present teachings that includes a lens body 10a disposed about an optical axis (OA) having an input surface 12 adapted to receive light from a light source 14 and an output surface 16 through which light exits the lens body. The optic 10 further includes a lateral surface 18 that extends between the input surface 12 and the output surface 16.

In this embodiment, the output surface 16 is formed by surfaces of a plurality of lenses 20 through which light exits the lens body. In this embodiment, the lenses 20 exhibit two different boundary shapes: an octagonal boundary shape and a square boundary shape. The term "boundary shape" of an optical element (e.g., a lens) as used herein refers to the shape of a projection of that optical element into a plane that is perpendicular to an optical axis of the element. The term optical axis is known in the art and is used herein consistent with its ordinary meaning in the art. For example, an optical axis of a lens can be an axis about which the lens exhibits some degree of symmetry, such as reflection symmetry. In some cases, the optical axis of an optical element, such as a lens, is an axis that is coincident with a central axis of light propagation through that optical element.

Figure 2:
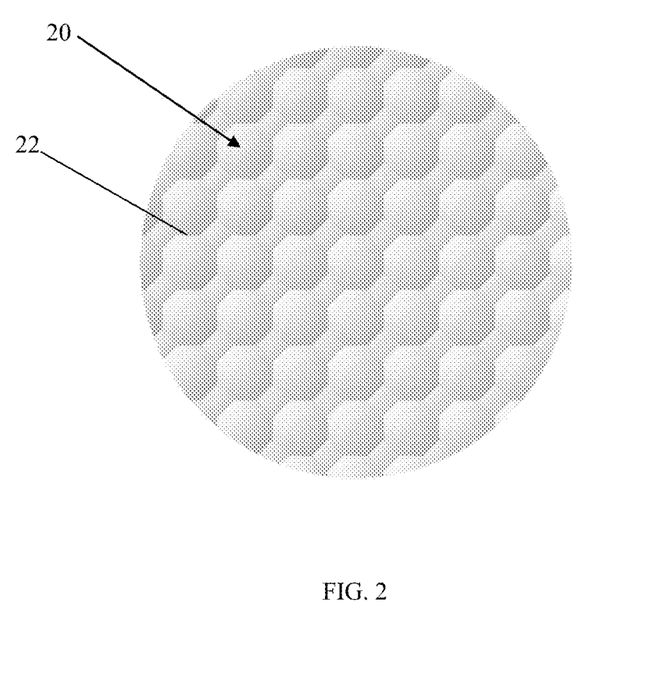
FIG. 2 is a projected view on a plane perpendicular to an optical axis of the optic.

By way of illustration, FIG. 2 schematically depicts that a projection of the lenses 20 onto a plane perpendicular to the optical axis (OA) provides a tiling distribution of the two boundary shapes 22 associated with the lenses 20. In other words, the boundary shapes 22 are arranged side-by-side to cover a portion of the plane with no gaps between adjacent boundary shapes 22. This tiling distribution is herein referred to as a truncated square tiling pattern.

In use, the light from the source 14 enters the lens body 10a via the input surface 12. At least a portion of the light entering the lens body 10a strikes the lateral surface 18 and is redirected by that surface, e.g., via total internal reflection or specular reflection, to the lenses 20. Another portion of the light entering the lens body reaches the lenses 20 directly without striking the lateral surface 18.

In this embodiment, the lenses 20 are in the form of a plurality of converging micro lenses. Each lens 20 directs the light incident thereon onto its respective focal point. The light focused by each lens 20 at its respective focal point diverges beyond that focal point to at least partially overlap in the far-field with a respective light beam directed by at least one adjacent lens. In this manner, the lenses 20 collectively generate a desired far-field illumination pattern. The term "far-field" as used herein refers to a region whose minimum distance from the output surface is significantly greater than a threshold, e.g., at least about 10, or at least about 20, or at least about 100 times greater than a diameter (OD) of the output surface 16.

The use of lenses with different boundary shapes advantageously allows generating a far-field illumination pattern having a boundary shape that is different than the boundary shape of a putative far-field illumination pattern that could be obtained by each of the lenses individually or by a similar collection of lenses having uniform boundary shapes corresponding, e.g., to one in which all lenses have one of the two above boundary shapes. In other words, in many embodiments, the overlap of light directed by at least two lenses having different boundary shapes can reduce, and in some cases eliminate, the signature of the boundary shapes of individual lenses on the far-field light intensity distribution.

Figure 3:
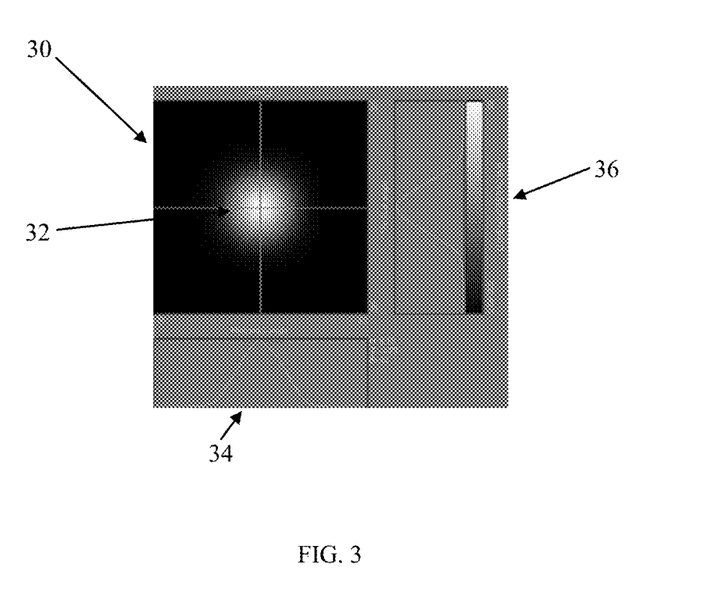
FIG. 3 is a far-field illumination pattern obtained by an exemplary proto-type implementation of the optic shown in FIGS. 1A and 1B.

For example, FIG. 3 depicts a far-field illumination pattern 30 obtained by a proto-type implementation of the optic 10 shown in FIGS. 1A and 1B. The prototype optic 10 includes an internally reflecting lateral surface 18 and an output surface 16 having a diameter of 21 mm with a plurality of microlenses 20 distributed across the output surface 16 as shown in FIG. 1B. In this prototype optic, the number of octagonal lenses was 47 and the number of square lenses was 52. The far-field illumination pattern 30 was obtained by using a light emitting diode (LED) manufactured by Philips Lumileds Lighting Company of San Jose, Calif., U.S.A. under the trade designation Rebel. As depicted in FIG. 3, the exhibited far-field illumination pattern 30 on a plane perpendicular to the optical axis (OA) has a substantially circular boundary shape 32 that is different from the boundary shapes of the individual microlenses 20, namely, octagonal and square. Further, in this illustrative example, the far-field light intensity distribution 34, 36 along each of the x and y axes, respectively, exhibits a super Gaussian distribution. Hence, the light intensity distribution does not carry variations corresponding to the structural variations associated with the pattern of the microlenses.

Figure 4A:
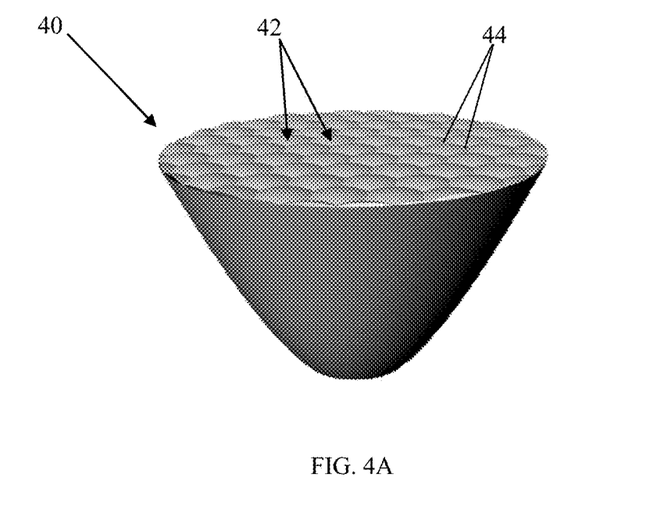
FIG. 4A schematically depicts a conventional optic that includes a plurality of microlenses having a uniform shape.
Figure 4B:
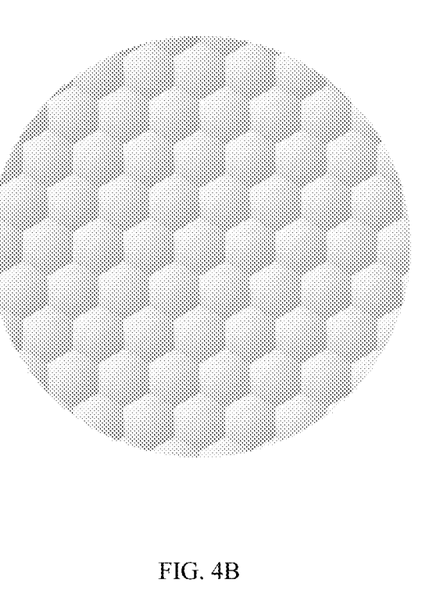
FIG. 4B is a projected view of the optic of FIG. 4A on a plane perpendicular to an optical axis of the optic.
Figure 5A:
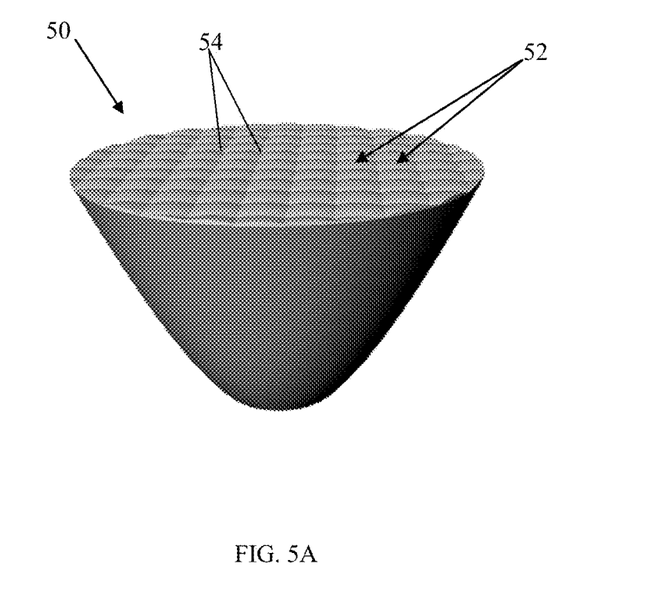
FIG. 5A schematically depicts another conventional optic that includes a plurality of microlenses having a uniform shape.
Figure 5B:
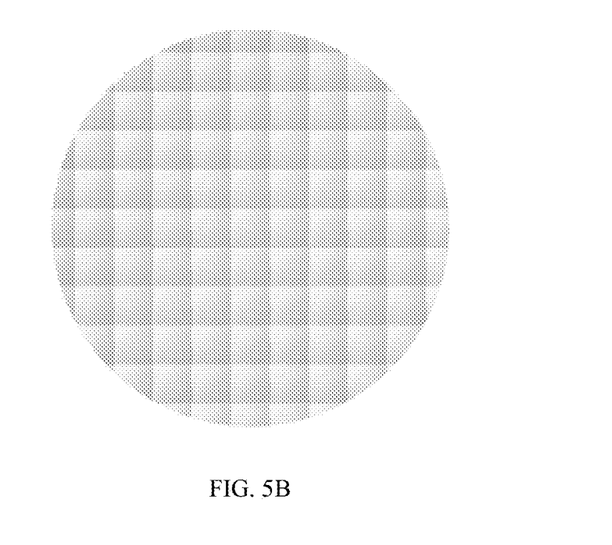
FIG. 5B is a projected view of the microlenses of the optic of FIG. 5A on a plane perpendicular to an optical axis of the optic.
Figure 6:
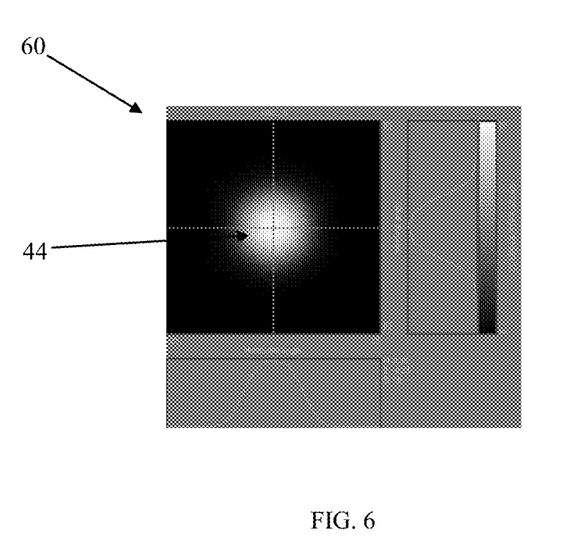
FIG. 6 is a substantially hexagonal far-field illumination pattern generated by the optic of FIG. 4A.
Figure 7:
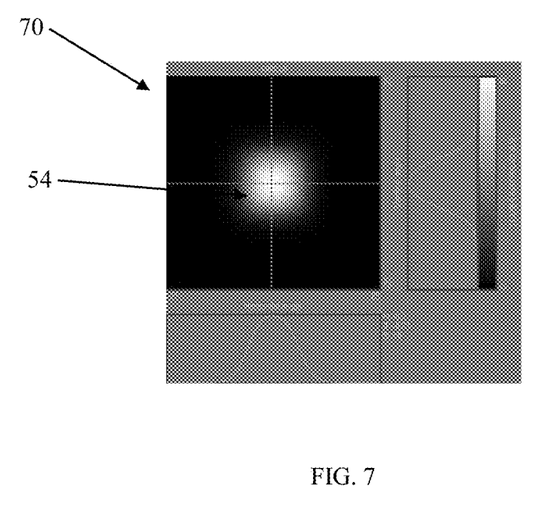
FIG. 7 is a substantially square far-field illumination pattern generated by the optic of FIG. 5A.

By way of comparison, FIGS. 4A and 5A schematically depict two conventional optics 40 and 50, respectively, that are structurally similar to the above optic 10 but include a plurality of microlenses 42, 52 having a uniform shape as their output surfaces. In case of the optic 40, all of the microlenses 42 have a hexagonal boundary shape 44 and in case of the optic 50, all of the microlenses 52 have a square boundary shape 54. FIGS. 4B and 5B depict a projected view on a plane perpendicular to an optical axis of microlenses 42, 52 as arranged in optics 40 and 50 respectively. As shown in FIG. 6, the boundary shape 44 of a far-field illumination pattern 60 generated by the optic 40 is substantially hexagonal. As is shown in FIG. 7, the respective boundary shape 54 of the far-field illumination pattern 70 generated by the optic 50 is substantially square. In other words, in these conventional optics, the far-field illumination pattern carries a signature corresponding to the shape of the lenses.

Figure 8:
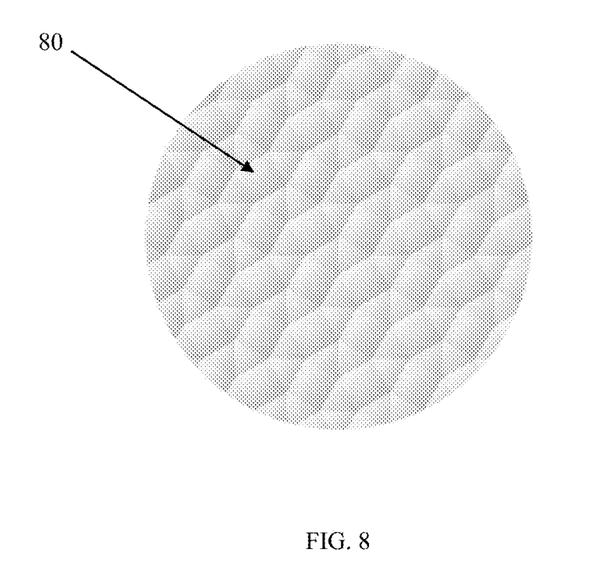
FIG. 8 is a snub square tiling pattern that can be utilized in some embodiments of an optic according to the teachings of the invention.
Figure 9:
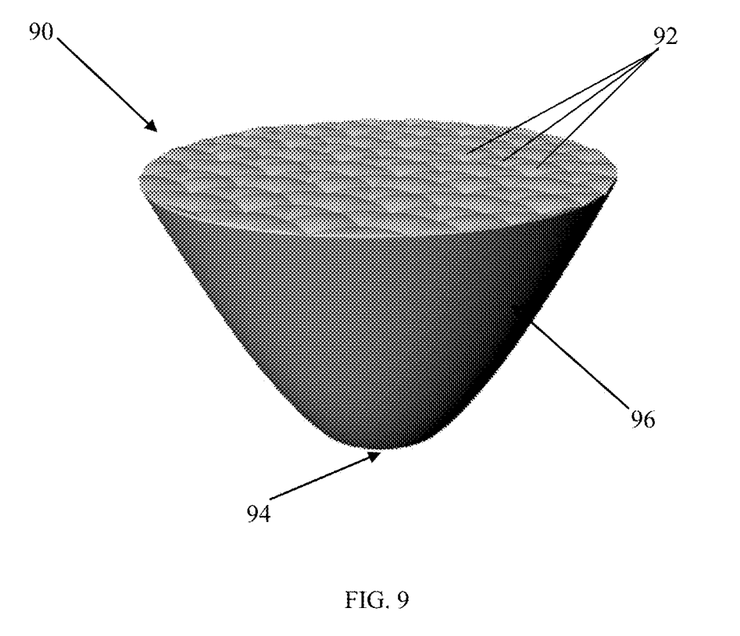
FIG. 9 depicts an optic according to an embodiment of the present teachings having a plurality of microlenses arranged according to a snub square tiling pattern.
Figure 10:
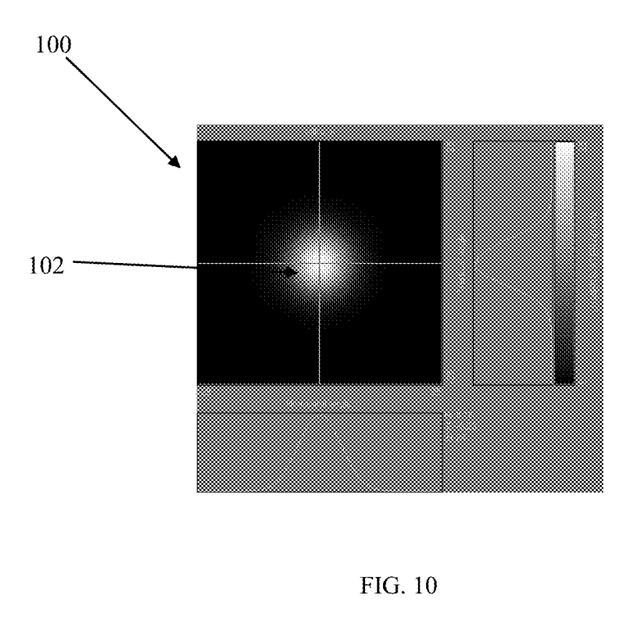
FIG. 10 is a far-field illumination lighting pattern obtained by using a proto-type implementation of the optic of FIG. 9, illustrating that the far-field illumination pattern exhibits a substantially circular boundary shape.

A variety of boundary shapes and tiling configurations, as well as a variety of number and/or density of lenses, can be utilized in various embodiments in accordance with the present teachings. By way of illustration, FIG. 8 shows a snub square tiling pattern 80 that can be utilized in some embodiments for a plurality of lenses, such as a plurality of microlenses forming an input or an output surface of an optic. By way of another example, FIG. 9 depicts an optic 90 according to another embodiment of the present teachings having a plurality of microlenses 92 arranged according to a snub square tiling pattern. The optic 90 includes an input surface 94 for receiving light from a light source (not shown), a lateral surface 96 that is configured to function as a TIR surface, a plurality of microlenses 92 through which light exits the optic 90, where the microlenses 92 are arranged according to a snub square tiling pattern. The diameter of the output surface was 21 mm and the number of microlenses was 81. FIG. 10 shows a far-field illumination lighting pattern 100 that can be obtained by a proto-type implementation of the optic 90, illustrating that the far-field illumination pattern 100 exhibits a substantially circular boundary shape 102. In other words, the far-field illumination pattern does not carry the shapes of the microlenses 90.

Figure 11:
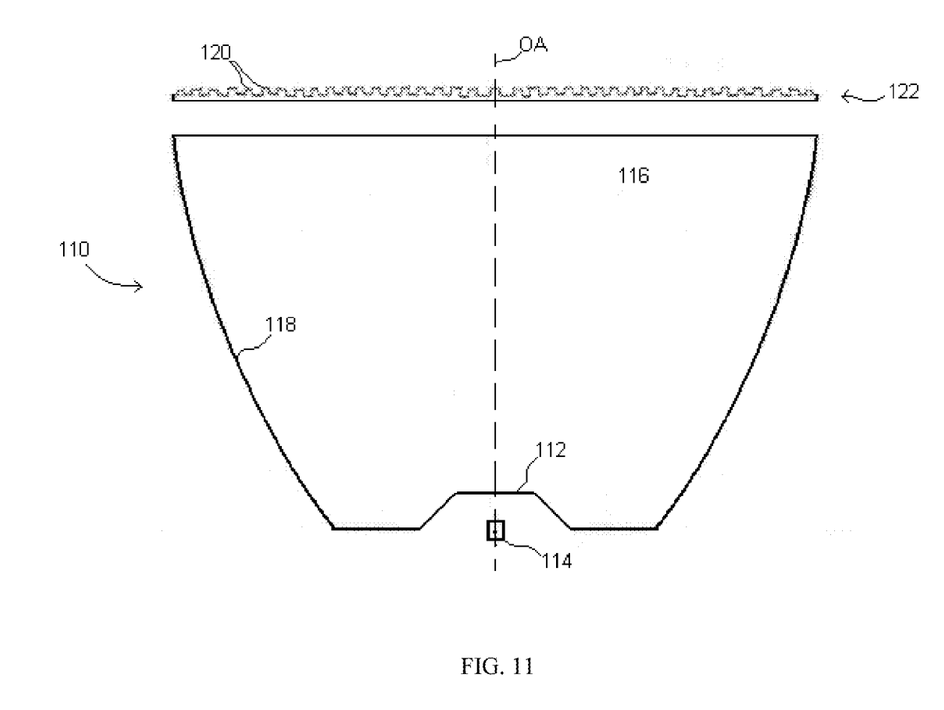
FIG. 11 schematically depicts an optic according to an embodiment including a lens and a plurality of microlenses having a truncated square tiling pattern formed as a separate unit.

The plurality of microlenses can be formed integrally with the optic, or can be formed separately and optically coupled to the optic. By way of example, FIG. 11 schematically depicts an optical device according to an embodiment, which includes an optic 110 having an input surface 112 for receiving light from a light source 114, and an output surface 116 through which light exits the optic 110, and a lateral surface 118 that extends between the input surface and the output surface and is configured to redirect the light incident thereon to the output surface 116. In this embodiment, a plurality of microlenses 120 having a truncated square tiling pattern is formed as a separate unit 122 and is optically coupled to the output surface 116 of the optic 110.

In some embodiments, the ability to vary the polygonal shapes of the lenses as well as their distribution pattern (e.g., tiling pattern) and their surface density advantageously allows generating a desired far-field illumination pattern.

Figure 12:
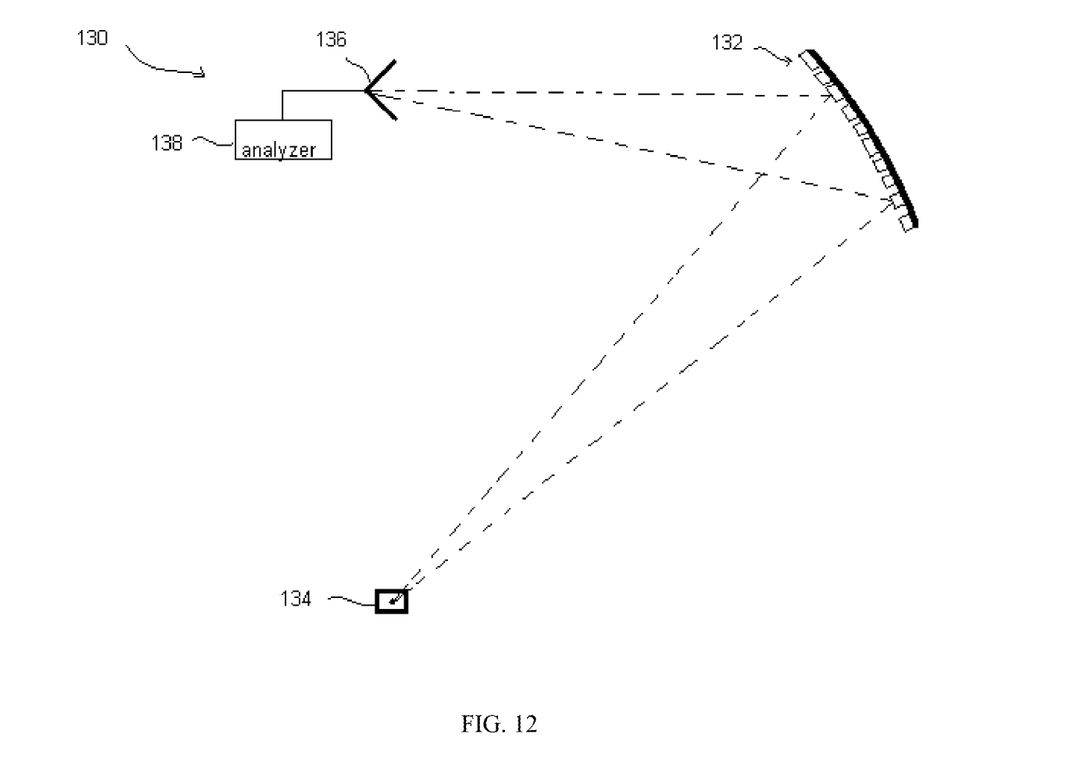
FIG. 12 schematically depicts an exemplary optical system having a plurality of reflecting elements (e.g., a plurality of flat and/or curved mirrors) disposed about an optical axis, where some of the mirrors have a hexagonal boundary shape and others have a square boundary shape.

In some embodiments, the present teachings can be applied to an optical device or system that includes a plurality of reflecting elements. By way of example, FIG. 12 schematically depicts an optical system 130 having a plurality of reflecting elements 132 (e.g., a plurality of flat and/or curved mirrors) disposed about an optical axis, where some of the mirrors 132 have a hexagonal boundary shape and others have a square boundary shape. In this embodiment, the mirrors 132 are arranged in a truncated square tiling pattern, such as that shown in FIG. 2. The mirrors 132 are configured to receive light from a source 134, e.g., an external source, and to collectively reflect the received light onto a detector 136 for detection. An analyzer 138 can then analyze the detection radiation. The overlap between the light reflected by mirrors 132 having different shapes can result in a far-field illumination pattern of the reflected light that does not carry the shapes of the reflecting mirrors 132.

The optics and optical devices and systems according to the present teachings can be fabricated using a variety of different materials and manufacturing techniques. For example, some suitable materials include, without limitation, polymethyl methacrylate (PMMA), glass, polycarbonate, cyclic olefin copolymer and cyclic olefin polymer. Some suitable techniques for fabricating the optics include, without limitation, injection molding and compression molding.

Those having ordinary skill in the art will appreciate that various changes can be made to the above embodiments without departing from the scope of the invention.

What is claimed is:
1. An optic, comprising:
   an input surface adapted to receive light from a light source,
   an output surface through which light exits the optic, a lateral surface extending between the input surface and the output surface and adapted to reflect at least a portion of light received from the input surface via total internal reflection to said output surface, said output surface comprising a plurality of lenses having at least two different geometrical boundary shapes positioned relative to one another according to a predefined pattern comprising repeating arrangements of said at least two different geometrical boundary shapes.

2. The optical system of claim 1, wherein said lenses are arranged such that far-field illumination patterns generated by said lenses at least partially overlap.

3. The optical system of claim 2, wherein said tiling pattern is a polygonal tiling pattern.

4. The optical system of claim 1, wherein said lenses are arranged such that a far-field illumination pattern collectively generated by said lenses exhibits a boundary shape different than a respective boundary shape of a far-field illumination pattern generated individually by any of said lenses.

5. The optical system of claim 1, wherein said lenses are arranged such that a far-field illumination pattern collectively generated by said lenses exhibits a super Gaussian intensity distribution along two orthogonal directions in a plane perpendicular to a central axis of light propagation.

6. The optical system of claim 1, wherein said lenses are arranged such that a projection of said lenses on at least one surface results in a tiling pattern in said surface.

7. The optical system of claim 1, wherein said lenses are arranged such that each of said lenses contacts its neighboring lenses.

8. The optical system of claim 1, wherein at least one of said lenses has a polygonal boundary shape.

9. The optical system of claim 8, wherein said polygonal boundary shape is any of a hexagonal, rectangular, square, an octagonal, and a triangular shape.

10. An optic, comprising:
an input surface adapted to receive light from a light source,
an output surface through which light exits the optic,
a lateral surface extending between said input surface and said output surface and adapted to reflect at least a portion of incident light received from the input surface via total internal reflection to said output surface,
wherein said output surface comprises a plurality of lenses having at least two different polygonal boundary shapes and positioned relative to one another according to a predefined pattern comprising a repeating arrangement of said at least two lenses having different boundary shapes such that a far-field illumination pattern generated by said lenses exhibits a super Gaussian intensity distribution along two orthogonal directions in a plane perpendicular to a central axis of light propagation.

11. The optic of claim 10, wherein said lenses are arranged such that a far-field illumination patterns generated by said lenses at least partially overlap.

12. The optic of claim 11, wherein said lenses are arranged such that a far-field illumination pattern generated collectively by said lenses exhibits a boundary shape different than a respective boundary shape of a far-field illumination pattern generated individually by any of said lenses.

13. The optic of claim 10, wherein said lenses comprise a plurality of microlenses.

14. The optic of claim 10, wherein each of said polygonal boundary shapes is any of a hexagonal, rectangular, octagonal, square and triangular shape.

15. The optic of claim 10, wherein said optic comprises an optical axis and wherein a projection of said lenses onto a surface orthogonal to said optical axis provides a tiling distribution of boundary shapes of said lenses on said surface.

16. The optic of claim 15, wherein said tiling distribution comprises a polygonal tiling.

17. An optic, comprising
a lens body having an input surface adapted to receive light from a light source and an output surface, at least one of said input and output surfaces comprising a plurality of lenses, said lens body further comprising a lateral surface extending from said input surface to said output surface,
wherein said lenses comprise a plurality of lenses having at least two different boundary shapes, wherein the lenses are arranged as repeating units of two or more lenses having said different boundary shapes.

18. The optic of claim 17, wherein said lenses exhibit polygonal boundary shapes.

19. The optic of claim 18, wherein said lenses are arranged relative to one another so as to provide a tiling pattern.

20. The optic of claim 19, wherein said tiling pattern is based on a predefined grid.

21. The optic of claim 17, wherein said lenses are configured such that a far-field illumination pattern generated collectively by said lenses exhibits a boundary shape that is different than a respective boundary shape of a far-field illumination pattern generated individually by any of said lenses.

22. The optic of claim 17, wherein said surface comprising said lenses exhibits a base curvature.

23. An optical system, comprising
a plurality of lenses adapted to receive light from one or more light sources,
wherein said lenses are configured to have a plurality of different boundary shapes and are arranged relative to one another such that a far-field illumination pattern generated collectively by said lenses exhibits a boundary shape that is different than a respective boundary shape of a far-field illumination pattern generated individually by any of said lenses, and wherein said far-field illumination pattern exhibits a super Gaussian intensity distribution along two orthogonal directions in a plane perpendicular to a central axis of light propagation.

* * * * *